Sept. 21, 1965

J. W. DALLY ET AL 3,206,970

CAPACITOR STRAIN GAGE

Filed Nov. 15, 1960

INVENTORS.
JAMES·W·DALLY
RICHARD·E·KENYON
RODNEY·H·CORNISH

BY

ATTORNEY

INVENTORS
JAMES·W·DALLY
RICHARD·E·KENYON
RODNEY·H·CORNISH

ATTORNEY

United States Patent Office 3,206,970
Patented Sept. 21, 1965

3,206,970
CAPACITOR STRAIN GAGE
James W. Dally, Richard E. Kenyon, and Rodney H. Cornish, Ithaca, N.Y., assignors to Therm Inc., Ithaca, N.Y., a corporation of New York
Filed Nov. 15, 1960, Ser. No. 69,456
4 Claims. (Cl. 73—88.5)

This invention relates to electric strain gages and more particularly to an improved strain gage of the variable capacitor type. It also relates to an alternating current bridge circuit adapted to measure the capacitance change produced by the strain gage.

An object of the invention is to provide a sturdy, reliable, reusable strain gage which embodies a high degree of sensitivity and accuracy, but nevertheless can be easily manufactured at a reasonable cost.

Another object is to provide a strain gage for the measurement of both static and dynamic strains which has a high degree of stability so that the gage does not drift and will return to its original zero position when the specimen to which it is attached is returned to its initial condition.

Another object is to provide a strain gage which is useable at high temperatures and which is temperature compensated to such a degree that the apparent strains produced by free thermal expansion of the specimen material do not influence the gage output.

Another object is to provide a strain gage of the type referred to with leads which are not influenced by stray capacitances which may exist when the gage is in operation.

Another object is to provide a suitable measuring instrument so that small changes in capacitance of the gage due to strain can accurately be recorded and can be easily converted to strain.

Another object of the invention is to provide a measuring instrument wherein the effect of capacitance changes in the lead wires due to thermal environment are minimized.

Another object of the measuring instrument is to provide a range of strain measurement consistent with current engineering needs.

Another object of the measuring instrument is to provide a sensitivity control on the measuring instrument so that it will be compatible with different gage configurations whose sensitivities are not all the same.

Another object of the measuring instrument is to provide readings which are linearly proportional to the strain on the gage and such that the reading is easily convertible to the strain which is being measured.

Another object of the invention is to provide a measuring instrument independent of changes of the carrier frequency employed in its operation.

Another object of the invention is to provide a measuring instrument capable of measuring both static and dynamic strains.

The above and other objects of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1:
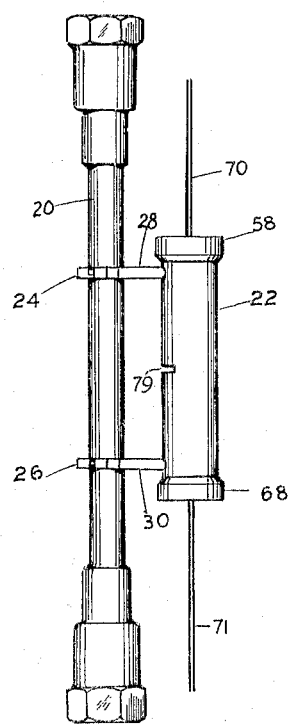
FIGURE 1 is an elevational view of the strain gage applied to a typical test specimen.
Figure 2:
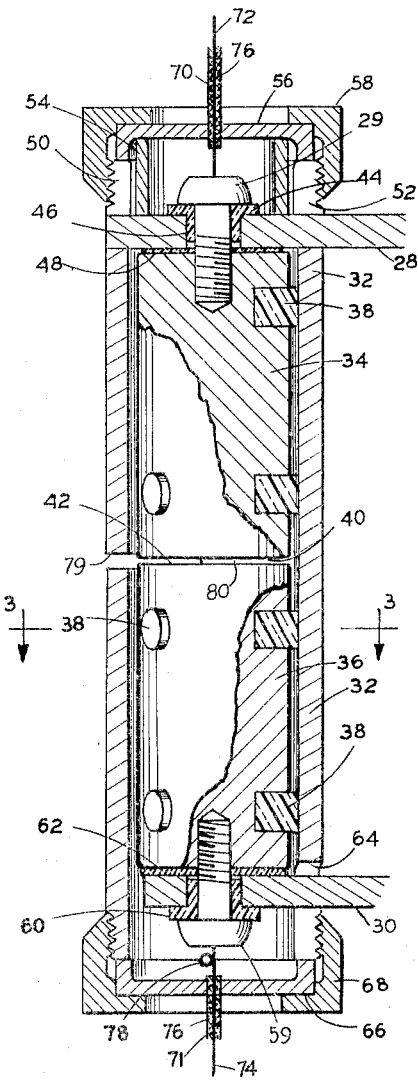
FIGURE 2 is a longitudinal section through the strain gage.
Figure 3:
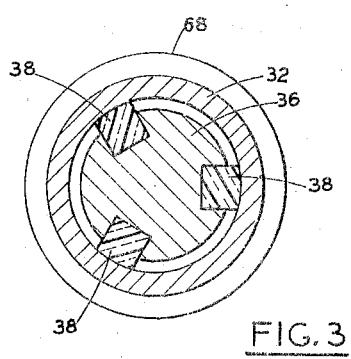
FIGURE 3 is a transverse section taken on the line 3—3 of FIGURE 2.

Referring to the drawings, there is shown in FIGURE 1, a test specimen 20 with the gage 22 clamped thereon, so as to embrace a test length intermediate the clamps 24 and 26, each clamp of which is formed as an extension of the rigid arms 28 and 30 projecting from within the gage 22. The gage as shown in FIGURE 2 comprises a cylindrical shell 32, within which are positioned cylindrical members 34 and 36 which are held in concentric spaced relation within the shell by spaced sets of three radial plug inserts 38, formed of insulating material which may be a ceramic. Each of the members 34 and 36 have spaced adjacent transverse parallel planar faces 40 and 42 which provide the air gap of a capacitance 80, the air gap spacing of which varies with stretch, or elongation of the test specimen between the clamps 24 and 26.

The upper cylindrical member 34 is rigidly secured to the arm 28 by a coaxial screw 29 that extends through an insulating bushing 44 disposed in an aperture 46 in the arm 28, and the arm is insulated from the member 34 by a thin disk of suitable insulating material 48. The arm is disposed radially across the shell, and rests in shell end slots 50 and 52. The arm rests in the ends of the slots, and is rigidly held thereagainst by an annular spacer sleeve 54 extending between the end cap 56 and the arm 28. The end cap 56 is held in place by the flanged ring 58, threaded on the end of the shell 32.

The cylindrical member 36 is rigidly secured to the arm 30, by a screw 59 which extends through an insulating bushing 60, the arm being insulated from the member 36 by an insulating disc 62. The arm 30 extends radially outward from the shell 32 through a slot 64, and the member 36 and arm 30 are slidable axially within the bore of the shell 32 while held concentric therein by two sets of three radial insulating plug inserts 38. The shell 32 is provided with a lower cap 66, held in place by a flanged ring 68 threaded on the lower end of the shell 32.

Each of the end caps have a central aperture through which extends a lead wire assembly, which assembly consists of a conductive tubular member or shield 70 and 71, having concentric lead wires 72 and 74 therein, and insulation 76 having a relatively high dielectric constant. The lead wires 72 and 74 may be of the same material as the screws 29 and 59, the lead 72 extending direct to the screw head, while the lead wire 74 is provided with a spiral section 78 to permit free relative axial movement between the element 36, and casing 32. The members 34, 36, screws 29, 58, and lead wires 72, 74 are preferably all of the same material to minimize thermo-junction effects.

The shell 32 is provided with a transverse slit 79, which is axially wider than the initial air gap provided between the surfaces 40 and 42 of the members 34 and 36. The slit 79 is disposed laterally of and adjacent to the air gap, to permit the insertion of a thin gage strip to facilitate initial adjustment of the air gap, when applying the gage to a test specimen as shown in FIGURE 1.

Figure 4:
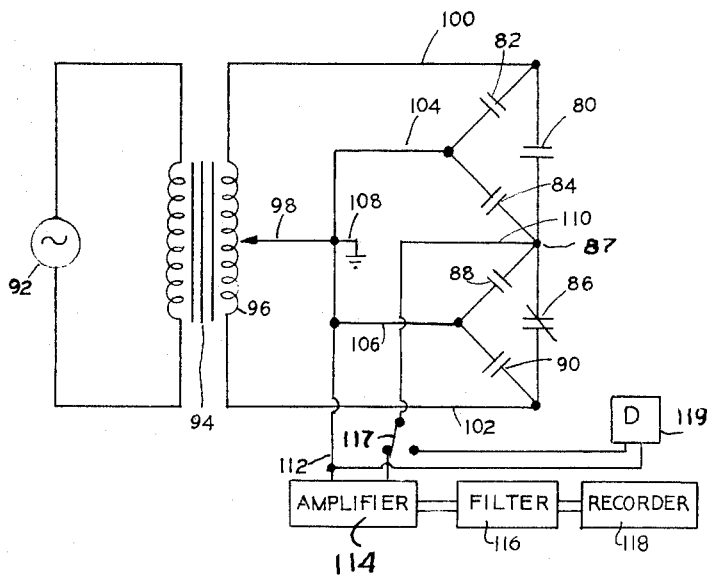
FIGURE 4 is a bridge circuit in which the gage forms a part.

It will be seen that the strain gage will on strain or elongation of the test specimen evidence a change in the air gap, with the effect of decreasing the capacitance thereof. In the bridge circuit diagram of FIGURE 4, the capacitance of the air gap is indicated at 80. The distributed capacity between the shell 32 and lead wire shield 70, and the element 34 and lead wire 72, is indicated by the capacitance as at 82, while the distributed capacity between the shell 32 and lead wire shield 71, and the element 36 and lead 74 is indicated by the capacitance as at 84, the shell 32 and shields 70 and 71 being grounded as at 108. The capacitances 80, 82 and 84 form a circuit that is essentially an arm of the bridge. An equivalent circuit comprising a capacitance 86, the value of which may be varied to cause it to correspond to the initial capacity of the air gap 80, and capacitances 88 and 90, which may be selected so as to be of the same value as capacitances 82 and 84, are provided as another arm of the bridge circuit and the two arms of the circuit are excited by a source of relatively high frequency alternating current 92 impressed on the bridge by the transformer 94, the secondary 96 of which is provided with a tap 98, which is grounded, and connected to the shield of capacitances 82 and 84, and to the equivalent sides of capacitances 88 and 90 as by leads 104 and 106. The secondary 96 is connected to gage capacitances 82 and 80 by a lead 100, and to capacitances 86 and 90 by a lead 102.

The junction 87, between the gage circuit capacitance 80 and the equivalent circuit capacitance 86, and the ground 108 are connected by leads 110 and 112 to a sensitive indicator, which may be in the form of an amplifier 114, which may in turn be connected to a filter 116, and recorder 118.

The tap 98 to the transformer secondary may be a center tap, or may be a variable tap where the transformer is of the ratio type. When the tap 98 is a center tap, and the capacitance 86 is adjusted so as to be equivalent to the capacity of the air gap 80, the bridge will be in balance, and a sensitive zero current detector 119 may be employed to indicate the absence of current flow or balance. A switch 117 is provided to provide for amplifier recorder operation, or detector zero current readings at will.

Employing the detector, the extent of the strain on the test specimen as indicated by the gage may be measured by varying the capacitance 86 to reestablish zero current flow, and the capacitance may be calibrated to provide a direct reading. On the other hand with the capacitance 86 initially adjusted to balance the bridge, the adjustment of the ratio transformer tap may be made to restore balance, and such adjustment may be calibrated to indicate the degree of strain.

If recording of the strain is desired, the tap 98 may be adjusted so as to be a center tap, capacitor 86 adjusted to balance the bridge, and thereafter the indication of strain may be recorded as a function of the amplitude of the unbalance current as amplified by the amplifier 114, and such indications may be recorded.

By employing a transformer secondary of low impedance, as compared to the impedance of the distributed capacitance as represented by capacitor 82 and capacitance of capacitor 90, the impedance of such distributed capacitance is in effect shunted and has a negligible effect on the performance of the circuit. In addition the distributed capacity represented by the capacitance 84, and the capacitance 88 are in shunt connection with the detector 119, and at zero current, as at balance, would have no effect.

Figure 5:
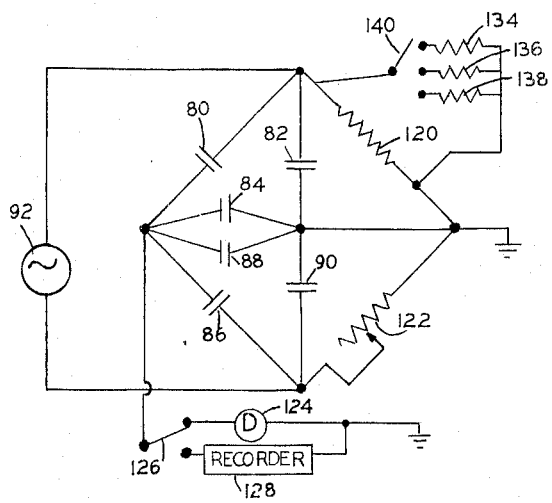
FIGURE 5 is an alternative bridge circuit of the capacitance resistor type.

In the bridge circuit shown in FIGURE 5, the gage capacitance 80, with the capacitances 82 and 84 representing the distributed capacity including shielded conductors, form one arm of the bridge circuit, while the equivalent circuit comprising capacitances 86, 88 and 90 form another arm. In order to provide a circuit relatively insensitive to frequency changes of the alternating current source of excitation 92 the other arms of the bridge circuit are comprised of resistances 120 and 122, the latter being variable to balance the bridge.

The existence of balance may be determined by a sensitive detector as at 124. Upon change in the capacitance 80, after initial balance, indicating strain, balance is restored by varying the resistance 122, which may be calibrated for the purpose. If dynamic readings are desired, the switch 126 is available to remove the detector from the circuit, and include a recorder 128 which may include amplification. If the circuit is initially balanced at no strain, the recorder will then record dynamic or transient strain. Resistors 134, 136 and 138 of various known values, may be provided with a switch selector 140, and one or the other of such resistors may be connected in parallel with resistor 120 to provide a calibration reading upon the recorder as often as desired.

In practice the material of which the gage is composed may be stainless steel or other high temperature resistant metals or may be made of material the same as the test specimen whereby to eliminate temperature effects. The conductors 72 and 74 may be insulated within the shields 76 by a powdered ceramic, so that the gage is readily adapted for use under extreme high temperature conditions, and the insulating bushings 44 and 60, and disks 48 and 62 may be of refractory material, mica or the like, so as to withstand high temperatures. The reference to air gap between the surfaces 40 and 42 is in a capacitance producing sense and may be construed as including various gases, vacuum, liquid, or other dielectrics suited to the circumstances.

Although a single embodiment of the invention and several circuits have been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A capacitance strain gage comprising a tubular conductive shell, conductive capacitance elements within the shell having transverse facing spaced capacitance surfaces forming an air gap capacitance, said elements being insulated from said shell, and at least one of said elements being freely movable toward and away from the other, means for mounting said gage upon a test specimen including a rigid mounting for said movable element upon the test specimen.

2. A capacitance strain gage comprising a tubular conductive shell, conductive capacitance elements within the shell having transverse facing spaced capacitance surfaces forming an air gap capacitance, said elements being insulated from said shell, and at least one of said elements being freely movable toward and away from the other, and a shielded lead wire extending from each of the opposite ends of the shell, the wires of which are connected with the respective elements and the shields of which are electrically connected with said shell.

3. A capacitance strain gage comprising a tubular conductive shell, conductive capacitance elements within the shell having transverse facing spaced capacitance surfaces forming an air gap capacitance, said elements being insulated from said shell, and at least one of said elements being freely movable toward and away from the other, and a shielded lead wire extending from each of the opposite ends of the shell, the wires of which are connected with the respective elements and the shields of which together with the shell form two distributed capacitances between the respective elements and lead wires.

4. A capacitance strain gage comprising an elongated cylindrical shell, diametrically opened slots extending into each end of the shell, the slots at one end being shorter than the other, gage mounting arms disposed in said slots at each end, said arms extending laterally to one side of the gage for mounting on a test specimen, cylindrical spaced capacitance elements within the shell and disposed in spaced relation from said shell, and having air gap spaced transverse surfaces disposed centrally of the length of said shell, insulated means for affixing one of said elements to each of said arms, and for spacing said elements from the shell, conductive caps having cylindrical skirts threaded on the ends of said shell partially overlying said slots, the skirt of said caps overlying slots at said one end bearing against the arm in said slot to rigidly secure the same therein, and the skirt of the other cap leaving a substantial length of the slots at the other end exposed whereby to provide clearance for axial movement of the arm and its element, a conductor having a tubular conductive shield extending through each end cap, the respective conductors being electrically connected to the respective elements adjacent the respective end cap, and the tubular shields being electrically connected through the end caps to said shell, and refractory insulating material disposed between the tubular shields and their respective conductors.

References Cited by the Examiner

UNITED STATES PATENTS

| | | | |
|---|---|---|---|
| 2,178,471 | 10/39 | De Bruin | 73—398 |
| 2,576,488 | 11/51 | Stovall et al. | 73—88.5 |
| 2,625,036 | 1/53 | Cowels | 73—88.5 |
| 2,630,007 | 3/53 | Howe et al. | 73—88.5 |
| 2,654,060 | 9/53 | Stovall et al. | 317—246 |
| 2,718,620 | 9/55 | Howe | 317—246 X |
| 2,808,545 | 10/57 | Hirtreiter et al. | 73—398 X |
| 2,866,141 | 12/58 | Frank et al. | 317—246 |
| 3,031,617 | 4/62 | Paquette | 317—246 X |
| 3,046,782 | 7/62 | Laimins | 73—88.5 X |

OTHER REFERENCES

Roberts, H. C.: "Mechanical Measurements by Electrical Methods"; Instruments Publishing Co., Inc., 1951; pages 7 to 40 (pages 7 and 36 relied on).

RICHARD C. QUEISSER, *Primary Examiner.*

C. A. CUTTING, DAVID SCHONBERG, *Examiners.*